Sept. 13, 1966 R. E. PADDOCK 3,271,989
METHOD OF AND APPARATUS FOR PRODUCING KITCHEN TOOL STALKS
Filed March 25, 1963 7 Sheets-Sheet 2

INVENTOR.
Raymond E. Paddock
By [signature]
Atty

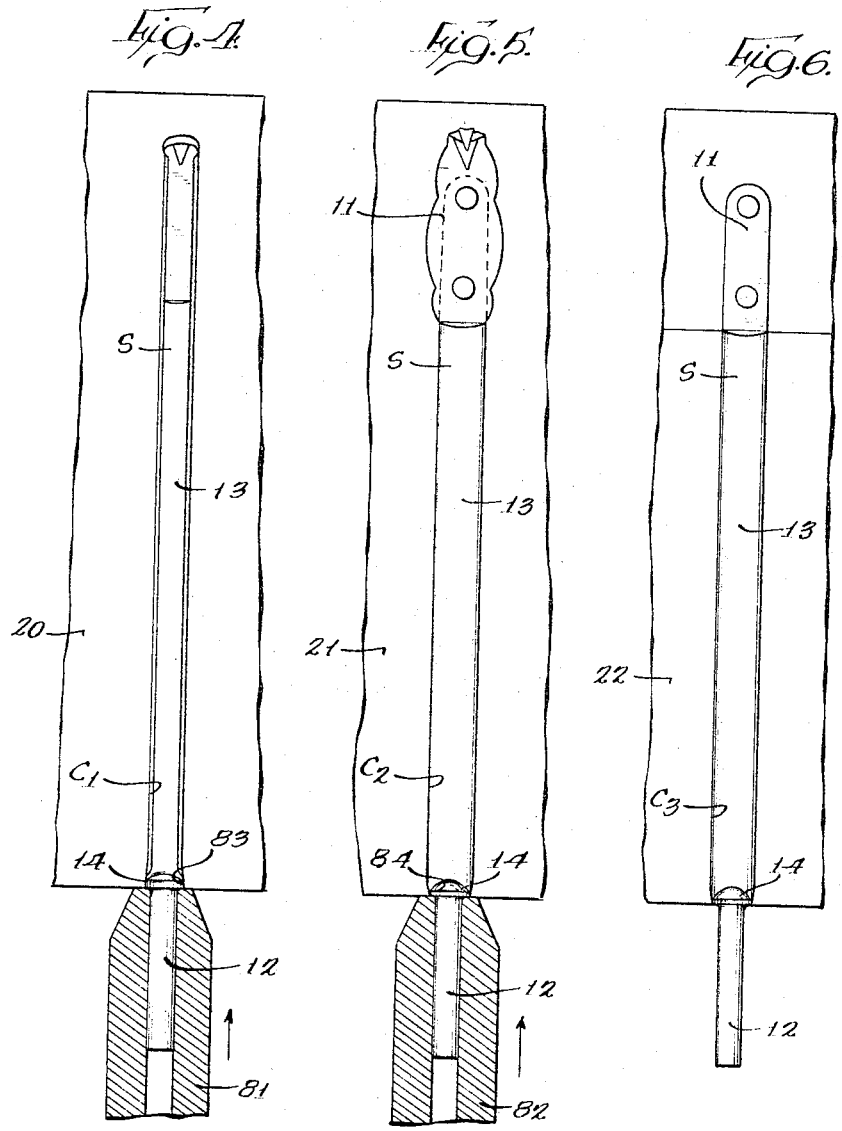

Sept. 13, 1966  R. E. PADDOCK  3,271,989
METHOD OF AND APPARATUS FOR PRODUCING KITCHEN TOOL STALKS
Filed March 25, 1963  7 Sheets-Sheet 5

INVENTOR.
Raymond E. Paddock

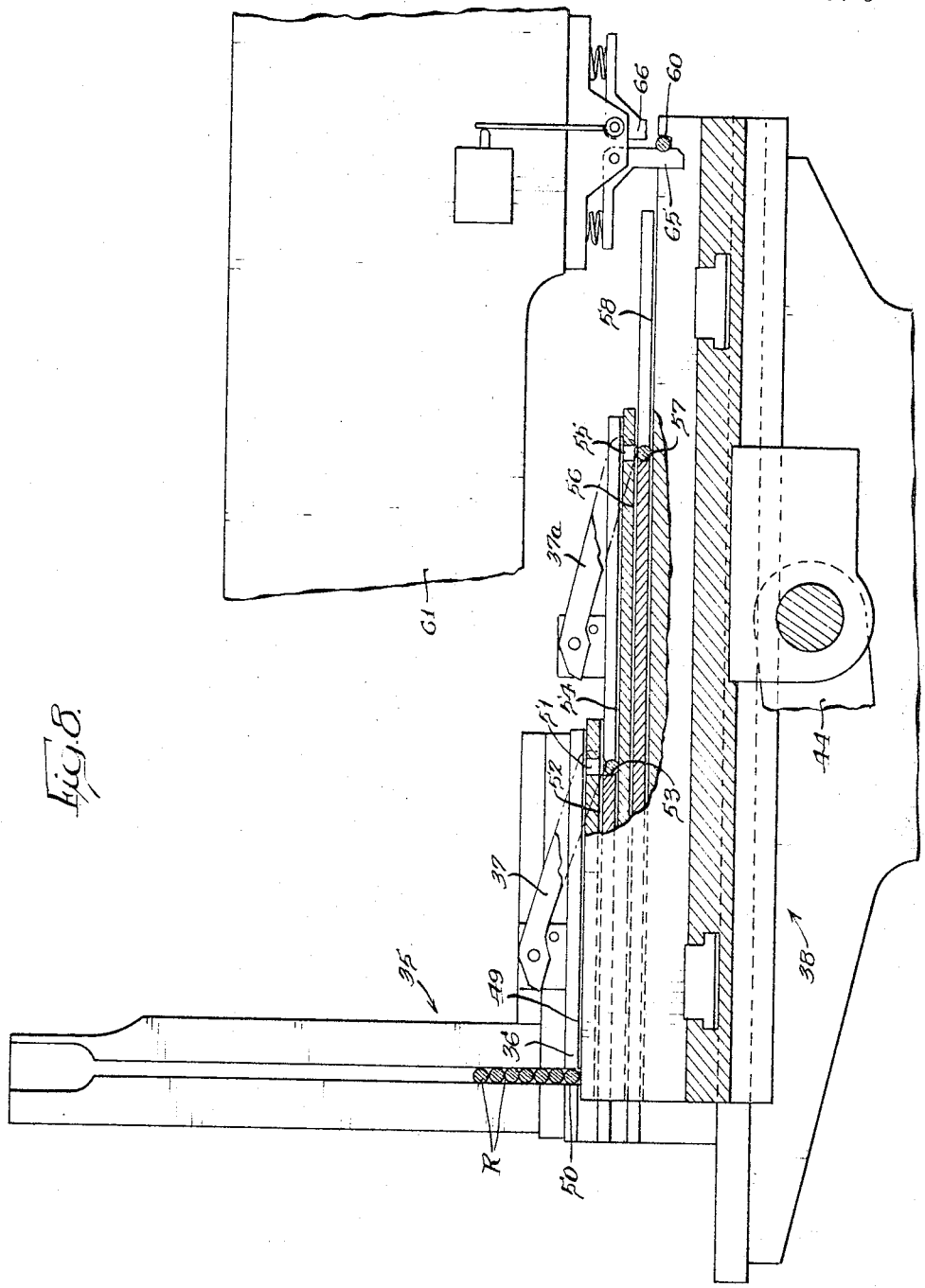

Sept. 13, 1966  R. E. PADDOCK  3,271,989
METHOD OF AND APPARATUS FOR PRODUCING KITCHEN TOOL STALKS
Filed March 25, 1963  7 Sheets-Sheet 7
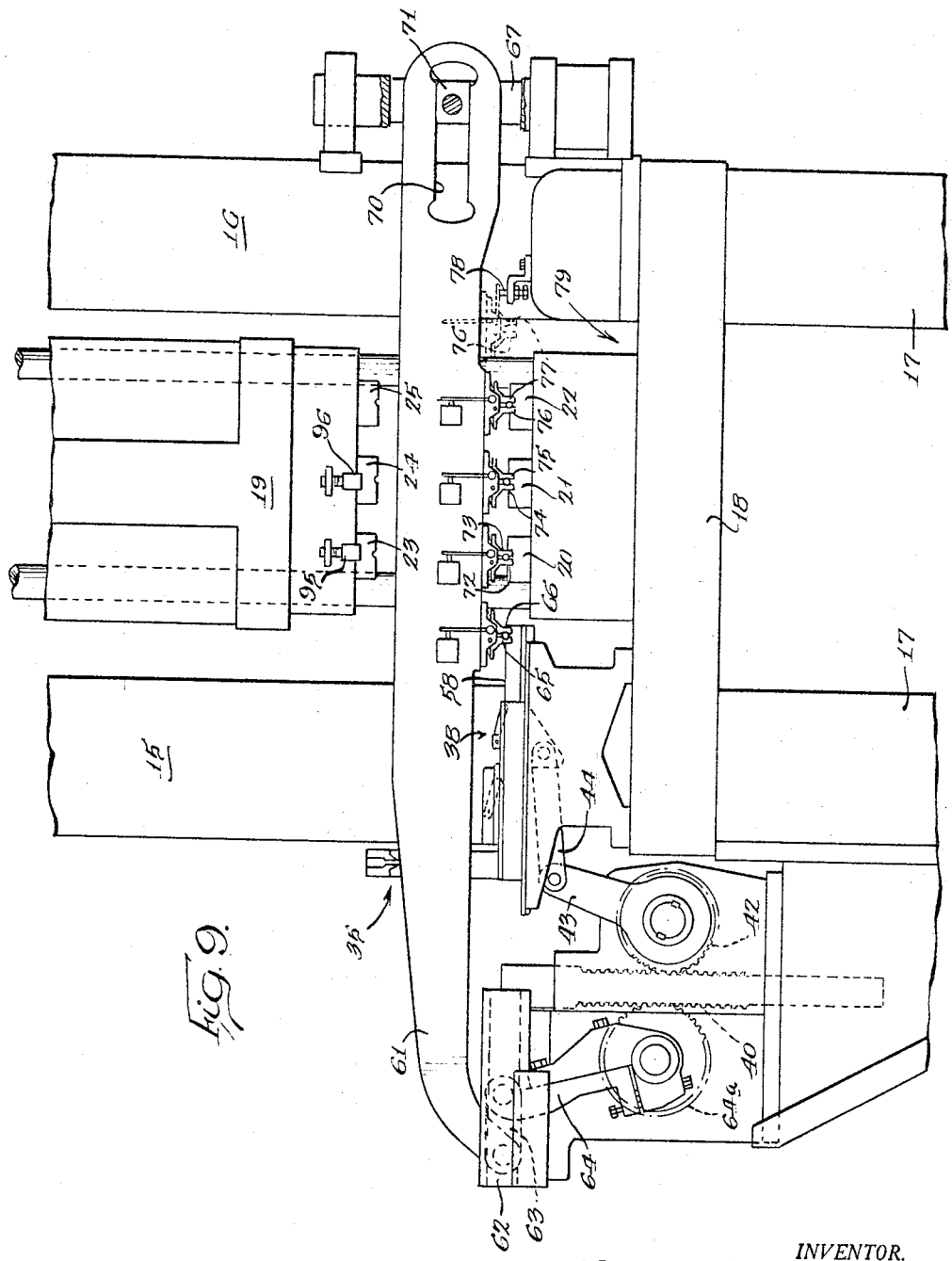
INVENTOR.
Raymond E. Paddock United States Patent Office 3,271,989
Patented Sept. 13, 1966

3,271,989
METHOD OF AND APPARATUS FOR PRODUCING KITCHEN TOOL STALKS
Raymond E. Paddock, Prospect Heights, Ill., assignor to Ekco Products Company, Chicago, Ill., a corporation of Delaware
Filed Mar. 25, 1963, Ser. No. 267,481
18 Claims. (Cl. 72—356)

The present invention relates to the production of stalks for kitchen tools and the like from wire rod stock of substantially uniform circular cross-sectional contour. More particularly, the present invention concerns a stalk of this character having a flat spatulate area defining the toolward end thereof and having a handleward end joined to said toolward end by a shank portion of non-circular cross-sectional contour. In accordance with the present invention, the junction of the shank portion and the handleward end portion of the stalk is defined by an enlargement formed in the blank in general symmetry with the longitudinal axis of the blank while opposite longitudinal side portions of the blank along areas thereof which ultimately constitute only the toolward end and the shank of the finished stalk are subjected to compression under impact of a pair of die members having matching impressions to define an inner cavity of desired contour which is filled out by the flow of material of the aforesaid blank areas confined between said die members.

In carrying out the production of a stalk in accordance with a preferred embodiment of this invention, a tool shiftable axially of the blank toward and away from a front cavity in said die members joined to said inner cavity and facing the area occupied by the handleward end portion of the blank, is effective to press the handleward end portion toward the shank portion and to gather the excess material of the blank which flows toward said front cavity during work performing action of the die members on said blank and cause the upset blank material to fill said front cavity so as to enlarge the dimension of the blank at said junction between the shank and handleward portions of the blank and simultaneously cause said enlargement to acquire a final contour which merges with the surface of the shank extending therefrom toward the toolward end of the blank while said die members are in work performing action on the toolward end and shank portions of said blank.

An object of this invention is to provide a novel method of and apparatus for manufacturing stalks for kitchen tools and the like from wire rod stock which is effective to simplify the fabricating operation and thereby make available a substantial saving in the overall cost of manufacture.

Other objects and features of this invention may more fully appear from the following detailed description taken in connection with the accompanying drawings which illustrate a single embodiment thereof and in which FIG. 1 illustrates, in front elevation, apparatus for the production of stalks in accordance with the present invention.

FIGS. 4, 5 and 6 show various stages of completion of the stalk while undergoing production in accordance with the method and apparatus of this invention.

FIG. 7 is an expanded fragmentary perspective view illustrating the process of this invention.

FIG. 8 is a side elevation of feeding mechanism by which blanks are delivered from the wire feeding and cutting means to the first work station defined by the die members.

FIG. 9 is an enlarged fragmentary section taken along line 9—9 of FIG. 1.

Figure 1:
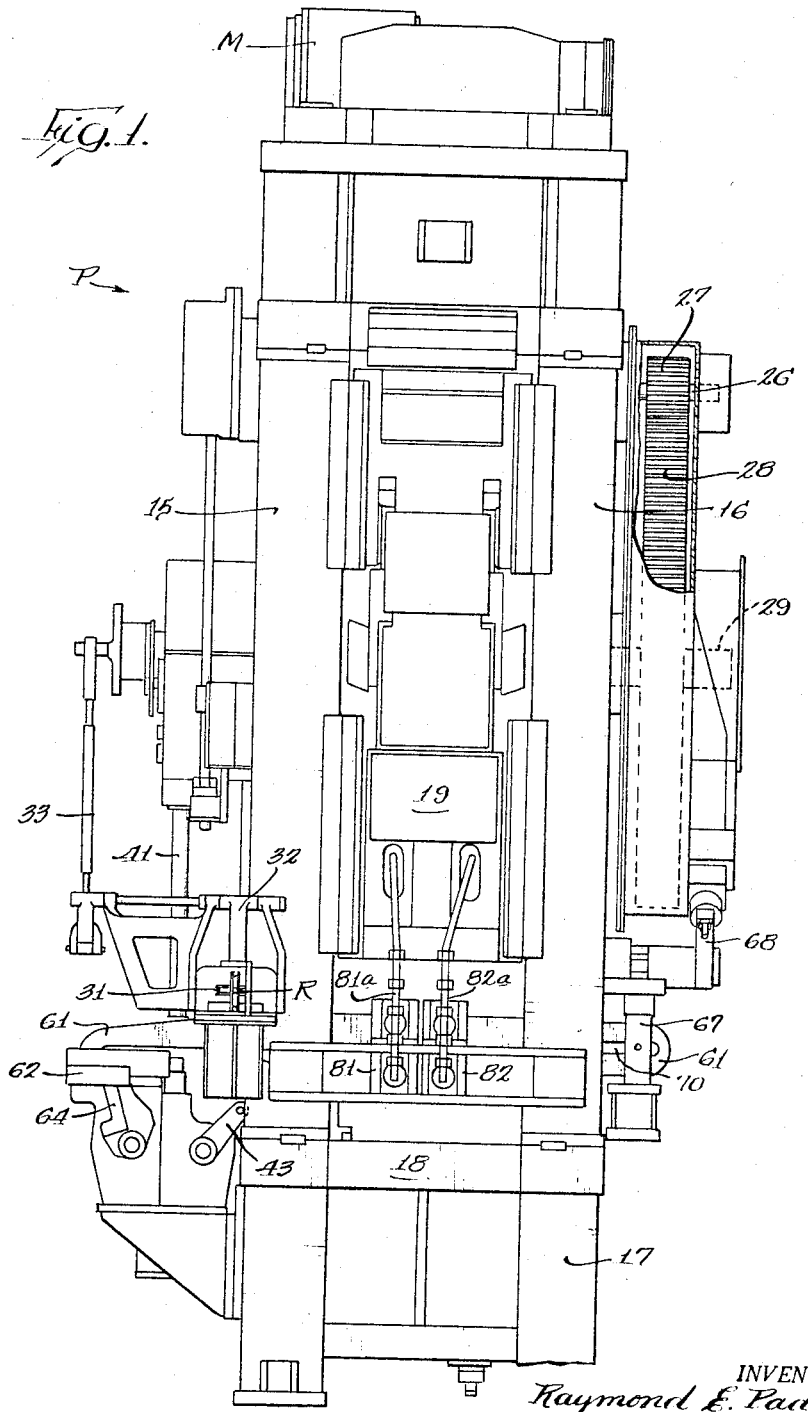

The machine illustrated in the drawings converts wire rod R from an appropriate reel 10 into a kitchen tool stalk S as illustratively shown in FIG. 6. As thus shown, the stalk includes a relatively flat spatulate toolward end portion 11 to which the functional part of the ultimately finished tool is secured by suitable means such as riveting or welding and a handleward end portion 12, said end portions being joined by a flattened shank portion 13 with the junction between the shank portion and handleward end portion defined by an enlargement or bolster 14.

Figure 2:
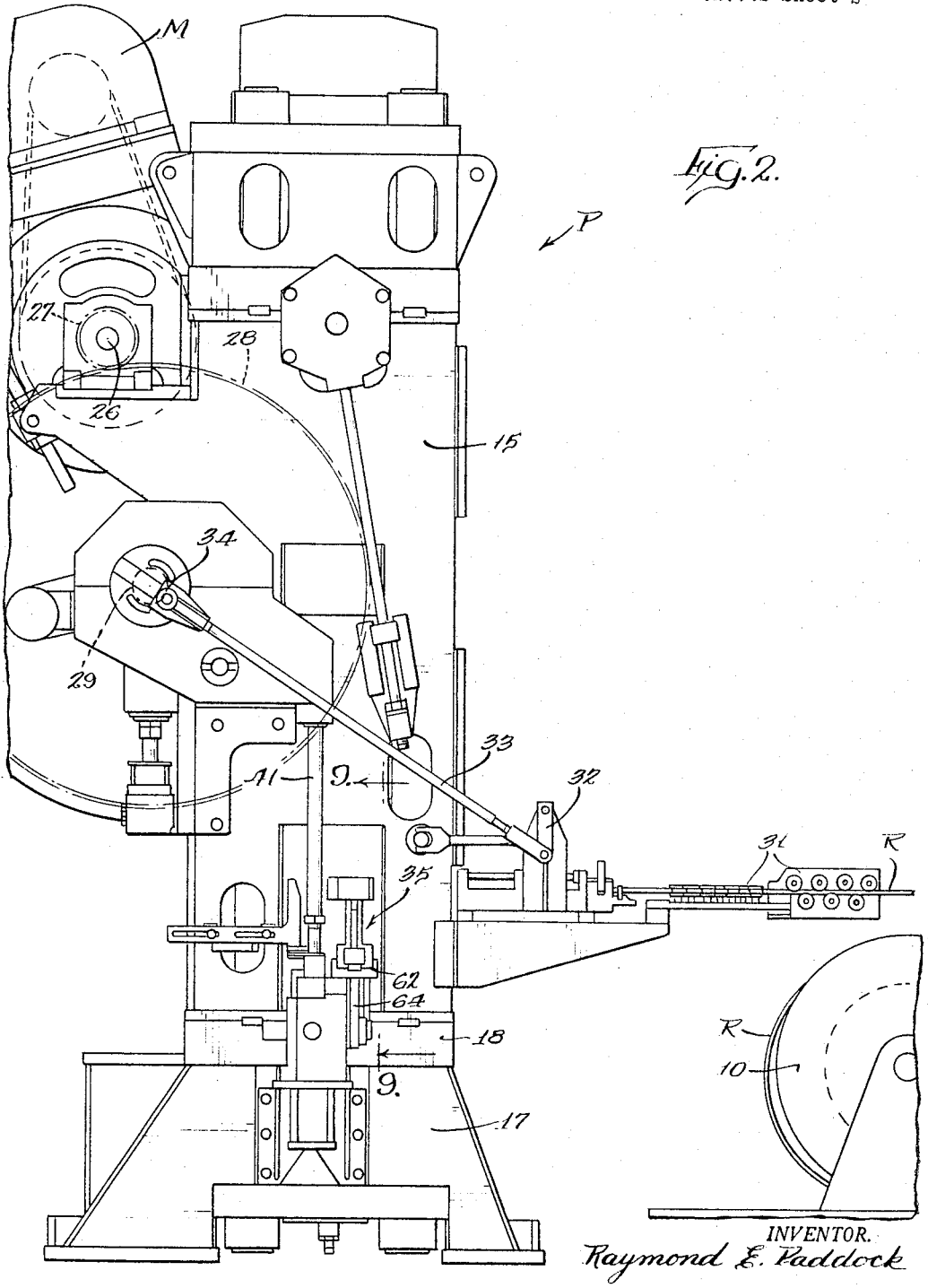
FIG. 2 is a side elevation of the apparatus shown in FIG. 1 taken from the left side of FIG. 1.

Apparatus for the production of tool stalks in accordance with the present invention, as shown in FIGS. 1 and 2, includes a press P having a pair of spaced apart columns 15 and 16 rising upwardly from a base 17. A bed 18 forms a part of the base 17 while a slide or ram 19 is supported for upward and downward movement between columns 15 and 16. The bed 18 and ram 19 are shown provided with die blocks 20, 21 and 22 and die blocks 23, 24 and 25 respectively. The die blocks 20, 21 and 22 have shaped impressions in upwardly facing and matching relation to similar impressions in the surface of blocks 23, 24 and 25 confronting die blocks 20, 21 and 22 to define a row of stalk blank receiving cavities or stations in equally spaced apart relation across the width of the bed 18 and designated $C^1$, $C^2$ and $C^3$ respectively as shown in FIGS. 4, 5 and 6. A motor M has driving connection with a drive shaft 26. Shaft 26 carries a gear 27 which drives a gear 28 on crank shaft 29 mounted in suitable bearings. Rotation of shaft 29 actuates the ram 19 between raised and lowered positions via toggle mechanism connecting said ram and shaft 29.

In FIG. 7, the ram 19 is shown in its raised position with the dies 23, 24 and 25 secured to the ram 19 in vertical alignment with the dies 20, 21 and 22 respectively secured to the bed 18. The stalk blanks S are shown as resting in the shaped impressions of the die blocks 20, 21 and 22 with the handleward end thereof projecting forwardly from the confines of the area defined by the upper face of the die blocks 20, 21 and 22.

The stalk blanks S are pre-cut lengths of the wire R which are successively advanced, one at a time, to said die blocks 20, 21 and 22 by wire feeding and cutting means as well as blank transfer means driven in timed relation with movement of the ram 19 between raised and lowered positions.

As shown in FIG. 7, the wire R passes from the reel 10 toward a shearing device 30 mounted on the press P via a wire straightener 31 and via wire feed means having coacting friction drive wheels actuated by driving means including a crank shaft 32 (see FIG. 2) operated from a connecting rod or pitman 33 connected to a slide block 34 and cooperating rotating holder having driving connection with suitable gearing associated with drive shaft 29. The length of the stroke of rod 33 is adjustable to conform with the desired length of the blank to be severed from the wire R. The severed blank falls by gravity into a stacking unit or magazine 35 in which a series of severed blanks are stored side by side in a single upright column with the longitudinal axis of said blanks extending along horizontal lines parallel to the lines along which the blanks are disposed when occupying the cavities in the die blocks.

Facilities for intermittently feeding the stalk blanks to the work area between the die blocks preferably utilize an elongated approach unit so as to provide necessary clearance between such feeding mechanism and the work area. To this end, magazine 35 is located in such relation to the work area as to deliver each stalk blank from the lower end thereof and initially position the blank at a distance from the nearest die block 20 that is exactly equal to a selected total of distance increments each matching the spacing between the stations defined by the cavities in die blocks. The approach unit accordingly includes a pair of stationary rails or guides 36 in spaced apart parallel relation along lines spanning the distance between the lower end of magazine 35 and the die block 20 and a shuttle unit 38 supported for shifting movement in a fixed horizontal path along said rails between a forward position as shown in FIG. 8 and a fully retracted position.

A rack 40 (see FIG. 9) reciprocating between raised and lowered positions under power of an actuating rod 41 having suitable driving connection with gearing associated with drive shaft 29 is operable to control movement of the shuttle in timed relation with the operation of the ram and the wire feeding and cutting means. The rack 40 has intermeshing engagement with a pinion 42 having driving connection with a crank arm 43 joined by a link 44 to the shuttle unit to effect forward or advance movement of the shuttle unit as the rack 40 is raised and to effect reverse or retracting movement of the shuttle unit as the rack 40 is lowered from a raised position. The stroke in which the shuttle unit 38 is thus moved is exactly equal to the spacing between the working stations defined by die blocks 20, 21 and 22.

The shuttle unit has a horizontal upper stretch defining a first landing area or platform 49 beneath the lower limits of the magazine so as to intercept the fall of each blank discharged from the stock of blanks in said magazine. While supported on said platform 49 of the shuttle unit, the blank is confined along opposite ends thereof within transversely aligned recesses 50 provided in the rails 36. An outlet slot 51 formed in the platform 49 is adapted to pass said blank to a ramp 52 defined by transversely aligned areas of the rails 36 along the path of and in downwardly offset relation to the platform 49 of the shuttle unit when the latter is in fully retracted position. A shoulder 53 defining an abrupt drop-off at the forward end of the ramp 52 has alignment with the outlet slot 51 in the platform 49 when the shuttle unit arrives at its limit of forward movement. Thus the blank falls from the ramp 52 as the shuttle unit is in its forwardmost position of movement. A second platform 54 on the shuttle unit in downwardly offset relation to ramp 52 of the rails 36 and projecting forwardly of the platform 49 intercepts the fall of the blank from ramp 52. Suitable releasable holddown arms 37 are mounted on the rails 36 for swinging movement between upwardly and downwardly rocked positions and biased by gravity to retain a downwardly rocked position. An outlet slot 55 is provided in platform 54 to provide a passageway through which the blank is caused to fall by gravity under weight of the hold down arms 37 to a second ramp 56 defined by transversely aligned areas of rails 36 along the path of and in downwardly offset relation to platform 54 of the shuttle unit when the latter is in fully retracted position. A shoulder 57 at the forward end of ramp 56 defines an abrupt drop-off with which the outlet slot 55 has alignment when the shuttle unit arrives at its limit of forward movement. Accordingly, the blank falls from ramp 56 via said shoulder 57 when the shuttle unit 38 is in its forwardmost position of movement, under weight of a second hold down arm 37a.

A third platform or landing area 58 is defined by an extension of the shuttle unit forwardly of platform 54 and in downwardly offset relation to ramp 56. The fall of the blank from ramp 56 is intercepted by platform 58 of the shuttle unit. A recessed seat 60 is provided along the forward limits of platform 58 so as to occupy a position at a distance from the work station defined by die block 20 that is exactly equal to the spacing between the blocks 20, 21 and 22. Action of the shuttle unit to transfer blanks S from the magazine 35 to the station defined by the seat 60 is effected by unison movement of the three platform members 49, 54 and 58 relative to ramps 52 and 56 and magazine 35, so as to travel between a position corresponding to the forward limit of movement of the shuttle unit 38 as shown in FIG. 8 to a position corresponding to the fully retracted position of the unit. When the latter is in such fully retracted position, the slot 51 of platform 49 is in vertical alignment with magazine 35. In the same position, the slot 55 of platform 54 is in vertical alignment with the shoulder 53 on ramp 52 and the seat 60 on platform 58 is in vertical alignment with shoulder 57 of ramp 56. In thus moving from said forward limit to said retracted position, a blank S in front of shoulder 57 of ramp 56 is dropped to the seat 60 on platform 58. While thus retained in seat 60 and the shuttle unit arrives at its forward limit of movement, the blank occupies a position or station in which it is grasped by blank gripping means provided on a transfer unit (more particularly described hereafter) which is also actuated by rack 40. The transfer unit includes an arm 61 having one end thereof pivotally joined to a slide 62 supported for reversible movement in a fixed horizontal path parallel to the path travelled by the shuttle unit 38 in a stroke matching the length of the stroke of the shuttle unit between advanced and retracted positions. The slide 62 is drivingly connected by link 63 to a crank arm 64 which rocks in unison with and coaxially with a pinion 64a having intermeshing engagement with rack 40. As shown in FIG. 9, the rack 40 is in a raised operated position effective to rock the crank arm 64 to the limit of its counterclockwise moved position so as to thereby operate the transfer arm to its retracted position as shown in FIG. 9. In this position of the arm 61, fingers 65 and 66 have gripping engagement with a stalk blank confined in the seat 60 on platform 58 of the shuttle unit when the latter is in forward position. The arm 61 is of such length as to reach across the area confronting the work area between the ram and bed of the machine and to project a distance beyond the area in front of the machine so as to establish connection with a transfer arm lifting and lowering unit having fixed support on the side of the machine remote from the area in front of the machine. This unit includes an actuator 67 having rising and falling movement in timed relation with operation of the ram between raised and lowered positions. The actuator 67 has driving connection with the main drive shaft 29 via mechanism including rocker arm 68. The arm 61 of the transfer unit has its end portion linked to the actuator 67 via a slot 70 presenting upper and lower edges which slidably engage cross head 71 having pivotal connection with the actuator 67. Thus as the arm 61 is moved between retracted and advanced positions lengthwise of the line of travel of the slide 62, slot 70 allows the arm 61 to shift along said line of travel relative to the actuator 67. At the same time the arm 61 is allowed to rock about its pivotal connection with the slide 62 under force applied to raise and lower the arm 61 via its connection with the actuator 67, as the latter rises and falls in timed relation with movement of the ram 19 between raised and lowered positions.

The slide 62 is effective to actuate the arm 61 along the line of movement of the shuttle unit a distance which exactly matches the stroke of the shuttle unit slide. It will thus be readily understood that in moving from its retracted position as shown in FIG. 9 to its advanced position under action of the rack 40 while the latter moves from the raised position as shown in FIG. 7 to its lowered position, that the blank gripped by the fingers 65 and 66 will be shifted from the pick-off station defined by seat 60 on the shuttle unit platform 58 to the first work station defined by die block 20. In performing this movement under the driving influence of slide 62, it will be noted that the upward and downward movement of the actuator 67 in unison with the upward and downward movement of the ram 19 will correspondingly rock the arm 61 upwardly about its pivotal connection with slide 62 and thereby cause the blank gripped by fingers 65 and 66 to be lifted and lowered while completing its travel from the pick-up station 60 on platform 58 of the shuttle unit to its work station on die block 20. Upon arrival at its work station on die block 20, the stalk blank is almost immediately subjected to the downward pressure of the die block 23 in response to the downward movement of the ram 19 so as to hold the blank in fixed relation to the die blocks 20 and 23 while the fingers 65 and 66 are disengaged and elevated from the blank in response to upward movement of the arm 61 caused by corresponding upward movement of actuator 67 in its next succeeding cycle of rising and falling movement in timed relation with corresponding movement of the ram 19. A coil spring urges the finger 65 toward the finger 66 so as to grip the blank while yieldable to allow the finger 65 to move away from finger 66 and thereby initially establish engagement and disengagement of the fingers from the blank incident to movement of the arm 61 in returning to retracted position from an advanced position and from a downwardly to an upwardly rocked position under control of the lifting and lowering unit. Arm 61 is also provided with a second set of fingers 72–73, a third set of fingers 74–75 and a fourth set of fingers 76–77 each set corresponding to the set of fingers 65 and 66 and in spaced apart relation to each of the other sets and to the set of fingers 65 and 66 along a line extending lengthwise of the line of movement of the arm 61 between retracted and advanced positions. The distance separating the sets of fingers matches the spacing between the die blocks 20, 21 and 23 whereby a blank positioned at the work station defined by die block 20 after completion of a work operation thereon by the die block 20 and its companion block 23, will be gripped by the fingers 72 and 73 and lifted and lowered by said fingers to the work station defined by die block 21 simultaneously with lifting and lowering action on the next trailing blank by fingers 65 and 66. At the same time as the blanks are thus moved by the fingers 65 and 66 and fingers 72 and 73, a blank previously positioned at the second work station defined by die block 21 will be gripped by the fingers 74 and 75 and lifted and lowered to the blank trimming station defined by die block 22, while a blank is moved from block 22 to a final or discharge station by fingers 76–77. On the next upstroke of the ram 19, the operation cycle of the arm 61 is repeated and the fingers carried thereby will advance each blank gripped thereby from its last occupied station to the next adjacent station.

It will be noted from FIGS. 4, 5 and 6 that the blank is progressively flattened while at the work stations defined by die block 20 and die block 21 while the blank is trimmed to its final shape in die block 22. For the purpose of releasing the blank from the grip of its fingers 76 and 77 on arrival of the blank gripped thereby at the discharge station, a stationary cam 78 presents a downwardly facing surface against which the finger 77 is engaged and forced thereby to separate from finger 76 and thus allow the finished blank to fall by gravity and to be discharged from the machine by a suitable chute 79. Reference numeral 80 designates air blast means for removing the excess portion at the toolward end 11 of the blank which is severed at the trimming station defined by die block 22.

The movement of the transfer arm 61 and the shuttle unit slide 38 with respect to each other and with relation to the movement of the ram 19 are such as to cause the stalk blanks to be transferred along a line of travel defined by movement of transfer arm 61 in a repetitive series of timed movement and dwell sequences in accordance with upward and downward travel of the ram 19.

During action on the stalk blank while undergoing work between die blocks 20 and 23 as well as between die blocks 21 and 24, the handleward portion of the blank projecting from the confines of the area between the die blocks is acted on by header tools 81 and 82 which have reversible sliding movement in unison toward and away from the die block 20 and die block 21 respectively along lines extending lengthwise of the axis of the blank acted on by the die blocks 20 and 23 and die blocks 21 and 24. Hydraulic cylinders and pistons for operating the same via conduits 81a and 82a provide the power required to advance the headers toward the blanks undergoing action between the die blocks and similar means provide power to retract the headers. Operation of these cylinders and pistons is controlled by a cam associated with the main drive shaft so as to cause tools 81 and 82 to complete a cycle of forward and rearward travel while the arm 61 of the transfer unit is in elevated position and thereby effective to prevent interference between the blank gripping fingers carried by the arm 61 and the header tools. Each header tool is effective to telescope the handleward portion of the blank in axial aligned relation thereto and while moving forwardly applies pressure against said handleward portion of the blank in the direction of the shank portion which produces an enlargement of the blank at the junction between the portion of the blank confined between the die blocks and the portion of the blank extending beyond the confines of said die blocks.

The front surface of die blocks 20 and 23 have matching indented areas defining a front cavity 83 which joins the inner cavity defined by the matching impressions of the confronting surfaces of the die blocks 20 and 23. A front cavity 84 is also defined by matching indented areas on the front surfaces of die blocks 21 and 24, which joins the inner cavity defined by the matching impressions of the confronting surfaces of the die blocks 21 and 24. The enlargement thus produced while the handleward end of the blank undergoes pressure of the header tool 81 is forced against the cavity 83 defined by the die blocks 20 and 23 to shape said enlargement to conform to the contour of the cavity 83. The header tool 82 likewise forces the enlargement into conformity with the contour of the cavity 84 defined by die blocks 21 and 24 while the blank undergoes action between said die blocks and the header tool 82.

Figure 3:
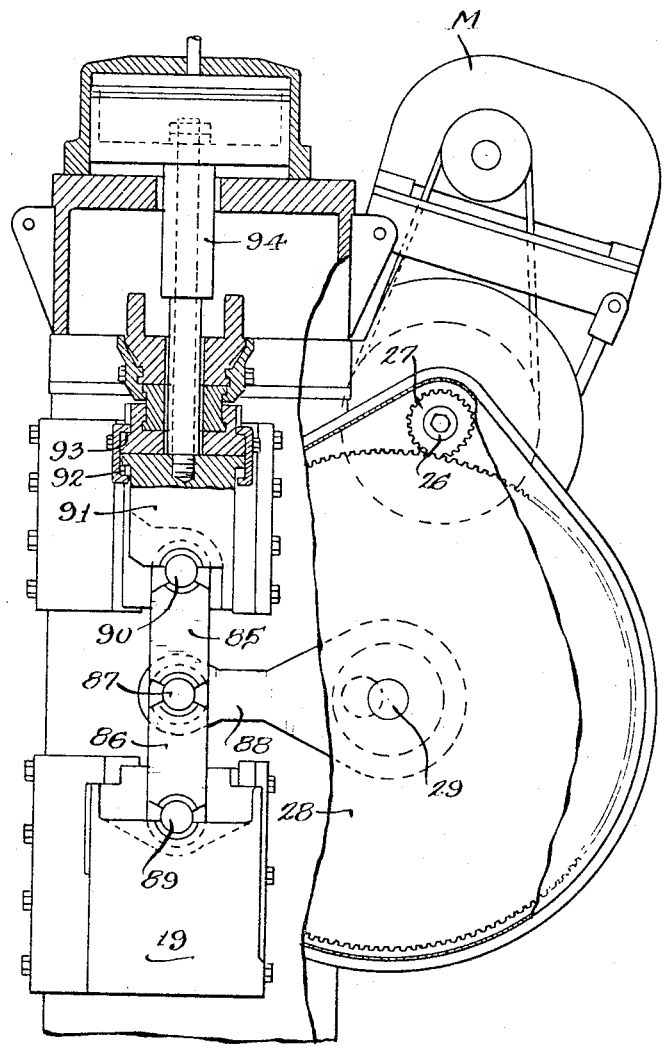
FIG. 3 is a similar view taken from the right side of FIG. 1 with portions in section.

Toggle mechanism, through which the ram 19 is raised and lowered in response to rotation of the shaft 29, is shown in FIG. 3. As thus shown, a pair of toggle arms 85 and 86 have a pivotal connection 87 with which the shaft 29 is linked via a connecting arm 88. Arm 86 is pivotally connected at 89 to the ram 19. Arm 85 is joined by pivotal connection 90 to an upper slide member 91 supported between the columns 15 and 16 for up and down movement between fixed seats 92 and 93. Slide member 91 is urged into a position of engagement with seat 92 under constant pressure of a fluid cylinder operated means designated generally by reference numeral 94. Accordingly, movement of slide member 91 toward the opposite seat 93 in response to action of the toggle arms 85 and 86 to lower the ram 19 is yieldably resisted by the fluid means 94. The resistance thus provided allows the die members to exert a holding pressure against the stalk blanks in response to action of the toggle arms in effecting movement of the slide member 94 from the lower seat 92 to the upper seat 93 and thereby maintaining a slight lag in the application of work deforming pressure on the stalk blanks pending withdrawal of the stalk blank transfer fingers from the path of the header tools 81 and 82. By so controlling the position of the slide member, the full action of the toggle arms 85 and 86 is so correlated with the operation of the header tools 81 and 82 as to cause the stalk blanks to undergo deforming action of the die members during the working stroke of the header tools 81 and 82.

For the purpose of maintaining axial alignment between the header tool and the axis of the blank confined between the die blocks, each header tool is supported for slight swinging movement about a horizontal axis 98 extending lengthwise of the line of travel of the blanks through the work station defined by the die blocks. Such hinge action assures axial alignment of the header tool with variations in the location of the longitudinal axis of the blank which develop incident to the deformation which the blank undergoes while undergoing action of the die blocks.

A pair of stabilizer legs 95 and 96 fixed to the ram 19 are disposed in upward vertical alignment with the path of the header tools 81 and 82 respectively. As the ram 19 lowers, the legs 95 and 96 have downward engagement with said tools via a roller 97 at the lower end of each of said legs coincident with arrival of said header tools in advanced position. Through such engagement with the header tools, the legs are effective to apply pressure in opposition to forces tending to lift the header tools incident to resistance exerted on the blanks in relation to the header tools while said blanks are subjected to the closing action of the die blocks.

What is claimed is:

1. In the production of one-piece stalks for kitchen tools and the like from wire rod stock of substantially uniform circular cross-sectional contour, the process which comprises providing a length of wire stock defining a blank of sufficient length to produce a stalk having a toolward end portion, a handleward end portion and a shank portion joining said end portions at a selected distance apart, subjecting said toolward end portion and said shank portion to pressure in an inner die cavity defined by opposed die members when said die members are in closed position so as to press said portions into a shape conforming to said inner cavity while allowing said handleward portion to occupy a position outside the confines of said die members, and simultaneously with said action upsetting the blank to form an enlargement at the junction between said handleward portion and said shank portion lengthwise of the direction of pressure exerted by said die members by compressing said handleward portion toward said shank portion and forcing said enlargement into a front cavity in said die members joined to said inner cavity and facing the area occupied by said handleward portion of the blank, so as to shape said enlargement in conformity with said front cavity.

2. In the production of one-piece stalks for kitchen tools and the like from wire rod stock of substantially uniform circular cross-sectional contour, the process according to claim 1, wherein said blank is subsequently subjected to a second operation in which pressure is applied along said toolward end portion and said shank portion of said blank in a second inner die cavity defined by said die members to further alter the shape of said toolward end portion and said shank portion of said blank while allowing said handleward portion to occupy a position outside the confines of said die members, and simultaneously with such further alteration of the blank, said handleward portion is subjected to a further upsetting action to increase the enlargement at the junction between said handleward portion and said shank portion.

3. In the production of one-piece stalks for kitchen tools and the like from wire rod stock of substantially uniform circular cross-sectional contour, the process according to claim 1, wherein said blank is subsequently subjected to a second operation in which pressure is applied along said toolward end portion and said shank portion of said blank in a second inner die cavity defined by said die members to further alter the shape of said toolward end portion and said shank portion of said blank while allowing said handleward portion to occupy a position outside the confines of said die members, and simultaneously with such furtrer alteration of the blank, said handleward portion is subjected to a further upsetting action to increase the enlargement at the junction between said handleward portion and said shank portion and wherein said blank is subjected to a trimming operation subsequent to said second operation.

4. In the production of one-piece stalks for kitchen tools and the like from wire rod stock of substantially uniform circular cross-sectional contour, the process according to claim 1, wherein said blank is subsequently subjected to a second operation in which pressure is applied along said toolward end portion and said shank portion of said blank in a second inner die cavity defined by said die members to further alter the shape of said toolward end portion and said shank portion of said blank while allowing said handleward portion to occupy a position outside the confines of said die members, and simultaneously with such further alteration of the blank, said handleward portion is subjected to a further upsetting action to increase the enlargement at the junction between said handleward portion and said shank portion and wherein said operations of cutting the blank from a length of wire stock and said first and second operations on the blank while undergoing action of said die members are each effected in timed relation with the others.

5. Apparatus for shaping an elongated blank of wire rod stock of substantially uniform circular transverse cross-sectional contour to form a stalk for a kitchen tool or the like in which said stalk has a handleward end portion and a shank portion forming an integral extension of said handleward end, said apparatus including a first die member movable toward and away from a closed position relative to a second die member to effect a forging action on a blank interposed between said die members, a blank feeding unit for disposing a blank in such interposed relation to said die members as to permit the shank portion of the blank to undergo forging action by said die members while said blank is arranged with its longitudinal axis transverse to the path of the first die member and while the handleward end portion of the blank occupies a position outside the range of such forging action of said die members, and blank upsetting means movable toward and away from said die members during such forging action of said die members on the shank portion, said blank upsetting means having engagement with said handleward end portion of the blank on movement toward said die members to compress said handleward end portion toward said shank portion and thereby produce an enlargement of the blank at the junction between said shank portion and said handleward end portion of the blank.

6. Apparatus in accordance with claim 5, wherein said die members have matching impressions to define an inner cavity of desired contour which is filled out by the flow of material of the portion of the blank interposed between said die members while undergoing forging action of said die members.

7. Apparatus in accordance with claim 5, wherein said die members have matching impressions to define an inner cavity of desired contour which is filled out by the flow of material of the portion of the blank interposed between said die members while undergoing forging action of said die members and wherein said die members have a front cavity joined to said inner cavity and facing the area occupied by the handleward end portion of the blank and said blank upsetting means is effective to force said enlargement of the blank into conformity with the contour of said front cavity incident to the action of the blank upsetting means to form said enlargement.

8. Apparatus according to claim 5, wherein said blank feeding unit is movable in recurring strokes between a retracted position and an advanced position along a path in intersecting relation to a line along which the longitudinal axis of the blank extends when operatively interposed between said die members, said unit when acting to dispose a blank between said die members is in an advanced position, and wherein said apparatus includes a blank supply station from which a blank is removed by said transfer unit when said unit is in retracted position preparatory to disposal of said blank in interposed position between said die members on subsequent arrival of said transfer unit in advanced position.

9. Apparatus for shaping an elongated blank of wire rod stock of substantially uniform circular transverse cross-sectional contour to form a stalk for a kitchen tool or the like in which said stalk has a handleward end portion and a shank portion forming an integral extension of said handleward end, said apparatus including a ram member movable toward and away from a closed position relative to a die holding member said ram and die holding members having confronting areas defining die members in first and second stations in spaced apart relation, said die members when in closed position acting to simultaneously effect a forging action on a first blank occupying said first station and a second blank occupying said second station, a blank feeding unit for simultaneously disposing said first and second blanks at said first and second stations respectively, so as to permit the shank portion of each of said blanks to undergo forging action by said die members while each blank is arranged with its longitudinal axis transverse to the path of the first die member and while the handleward end portion of each blank occupies a position outside the range of such forging action of said die members, blank upsetting means movable toward and away from said die members during such forging action of said die members on the shank portion of each of said blanks, said blank upsetting means having engagement with said handleward end portion of said blanks on movement toward said die members to compress said handleward end portion of the first blank toward the shank portion of the first blank and to compress said handleward end portion of the second blank toward the shank portion of the second blank and thereby produce an enlargement on each blank at the junction of the shank portion and handleward portion of each blank.

10. Apparatus according to claim 9, wherein each blank is successively delivered to said first and second stations by said blank feeding unit, and said die members in effecting such forging action cause each blank to be progressively deformed at said first and second stations.

11. Apparatus according to claim 9, wherein said first station is defined by a cavity formed by matching impressions in said die members, and said second station is defined by a second cavity of a contour at variance to the contour of the cavity defining said first station, and the cavity at each of said stations is filled out by the flow of material of the portion of the blank occupying said cavity while undergoing forging action of said die members.

12. Apparatus according to claim 9, wherein said first station is defined by an inner cavity formed by matching impressions in the confronting faces of said die members and said second station is defined by a second inner cavity formed by matching impressions in the confronting faces of said die members and having a contour at variance to the contour of the first inner cavity, and each cavity being adapted to be filled out by the flow of material of the portion of the blank occupying said cavity while undergoing forging action of said die members, a first front cavity provided in said die members joined to said first inner cavity and facing the area occupied by the handleward end portion of the blank at said first station, a second front cavity provided in said die members joined to said second inner cavity and facing the area occupied by the handleward end portion of the blank at said second station, and wherein said blank upsetting means is effective to force said enlargement of each blank at the junction of said shank portion and handleward portion thereof into conformity with the contour of the front cavity which faces the area occupied by the handleward portion of said blank.

13. Apparatus according to claim 5, wherein the blank feeding unit is movable in recurring strokes between a retracted position and an advanced position, and said unit being effective to dispose a blank in interposed relation to said die members as an incident to movement from retracted to advanced position, and blank holding means incorporated in said blank feeding unit engaging said blank during such movement of the unit from retracted to advanced positions, said blank holding means being yieldable to the holding action of said die members against a blank interposed therebetween while in closed position to disengage said blank from said transfer unit holding means incident to movement of said unit from advanced to retracted position.

14. Apparatus according to claim 5, wherein the blank feeding unit is movable in recurring strokes between a retracted position and an advanced position, and said unit being effective to dispose a blank in interposed relation to said die members as an incident to movement from retracted to advanced position, and blank holding means incorporated in said blank feeding unit engaging said blank during such movement of the unit from retracted to advanced positions, said blank holding means being yieldable to the holding action of said die members against a blank interposed therebetween while in closed position to disengage said blank from said transfer unit holding means incident to movement of said unit from advanced to retracted position and a blank supply station for maintaining a blank in a position, engageable by said feed unit blank holding means when said feed unit is in retracted position.

15. Apparatus according to claim 5, wherein the blank feeding unit is movable in recurring strokes between a retracted position and an advanced position, and said unit being effective to dispose a blank in interposed relation to said die members as an incident to movement from retracted to advanced position, and blank holding means incorporated in said blank feeding unit engaging said blank during such movement of the unit from retracted to advanced positions, said blank holding means being yieldable to the holding action of said die members against a blank interposed therebetween while in closed position to disengage said blank from said transfer unit holding means incident to movement of said unit from advanced to retracted position and means for supplying a blank to said blank feeding unit including a magazine in which a series of blanks are stored side by side in a vertical column, and a shuttle operates between forward and retracted positions to receive said blanks, one at a time, from said magazine and to deliver the same to said feed unit blank holding means when said shuttle is in forward position.

16. Apparatus according to claim 5, wherein the blank feeding unit is movable in recurring strokes between a retracted position and an advanced position, and said unit is effective to dispose a blank in interposed relation to said die members as an incident to movement from retracted to advanced position via fingers on said unit which obstruct the path of said blank upsetting means when said feed unit is in advanced position, and drive means for controlling movement of said first die member, said drive means being effective to maintain said first die member in a blank holding position relative to said second die member pending withdrawal of said blank holding fingers on the blank feeding unit incident to movement of said unit toward a retracted position and thereafter effective to move said first die member to a blank forging position.

17. Apparatus according to claim 5, wherein the blank feeding unit is movable in recurring strokes between a retracted position and an advanced position, and said unit is effective to dispose a blank in interposed relation to said die members as an incident to movement from retracted to advanced position via fingers on said unit which obstruct the path of said blank upsetting means when said feed unit is in advanced position, and drive means for controlling movement of said first die member, said drive means including a rotary drive shaft and toggle mechanism operable in reponse to rotation of said drive shaft, and a slide member having limited movement from a first position to a second position in response to action of said toggle mechanism in a direction to move said first die member toward said second die member and biased toward said first position, said slide member being operable to render said toggle mechanism ineffective to move said first die member to a blank forging position until said slide member is moved from said first to said second position and operable through said toggle mechanism to maintain said first die member in a blank holding position relative to said second die member pending withdrawal of said blank holding fingers on the blank feed unit incident to movement of said unit toward a retracted position.

18. Apparatus according to claim 5, wherein said die members have matching impressions to define an inner cavity of desired contour which is filled out by the flow of material of the portion of the blank interposed between said die members while undergoing forging action of said die members and wherein said die members have a front cavity joined to said inner cavity and facing the area occupied by the handleward end portion of the blank and said blank upsetting means is effective to force said enlargement of the blank into conformity with the contour of said front cavity incident to the action of the blank upsetting means to form said enlargement, and wherein the blank feeding unit is movable in recurring strokes between a retracted position and an advanced position, and said unit is effective to dispose a blank in interposed relation to said die members as an incident to movement from retracted to advanced position via fingers on said unit which obstruct the path of said blank upsetting means when said feed unit is in advanced position, and drive means for controlling movement of said first die member, said drive means being effective to maintain said first die member in a blank holding position relative to said second die member pending withdrawal of said blank holding fingers on the blank feeding unit incident to movement of said unit toward a retracted position and thereafter effective to move said first die member to a blank forging position.

References Cited by the Examiner

UNITED STATES PATENTS

| | | | |
|---|---|---|---|
| 812,856 | 2/1906 | Voss | 72—357 |
| 1,007,792 | 11/1911 | Orton | 72—432 |
| 1,169,914 | 2/1916 | Bates | 72—357 |
| 1,805,124 | 5/1931 | Wilcox | 72—357 |
| 1,977,164 | 10/1934 | Wilcox | 10—18 |
| 2,389,738 | 11/1945 | Olney | 72—419 |
| 3,105,399 | 10/1963 | Strugala | 10—166 |
| 3,154,801 | 11/1964 | Byam | 10—12 |

CHARLES W. LANHAM, *Primary Examiner.*

G. P. CROSBY, *Assistant Examiner.*